Nov. 10, 1942.     C. C. ANDERSON     2,301,844

TELEGRAPH ALARM SYSTEM

Filed July 8, 1941

INVENTOR
C.C. Anderson
BY
ATTORNEY

Patented Nov. 10, 1942

2,301,844

UNITED STATES PATENT OFFICE 2,301,844

TELEGRAPH ALARM SYSTEM

Clyde Christen Anderson, San Mateo, Calif., assignor to American Telephone and Telegraph Company, a corporation of New York Application July 8, 1941, Serial No. 401,431

3 Claims. (Cl. 178—69)

This invention relates to alarm systems and more particularly to arrangements for indicating "hits" on electrical circuits such as telegraph systems.

Line "hits" may be short open pulses or other forms of line interference which impart transmission over the line. Since these hits are apt to produce errors in the messages received, it is desirable that they be detected and the fault eliminated as soon as possible. The primary object of the arrangements of the invention is to provide arrangements for indicating "hits" on a subscriber's loop circuit in a telegraph system. A further object of the invention is to provide such a "hit" indicator which will function efficiently under certain circuit conditions under which other types of "hit" indicators will not function efficiently. Other objects and features of the invention will appear more fully from the detailed description thereof hereinafter given.

Figure 1:
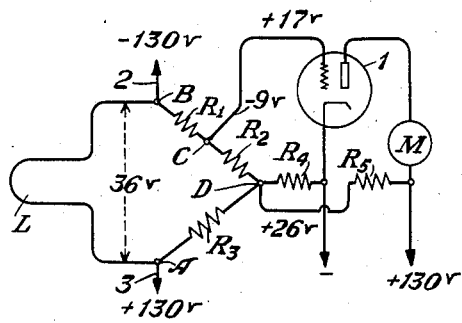
Figure 2:
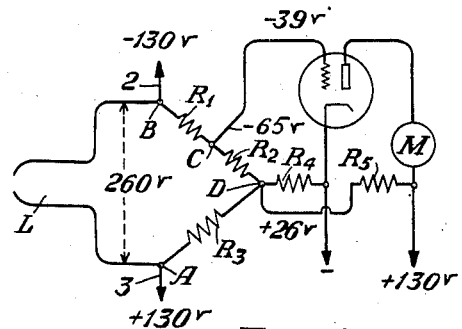
Figure 3:
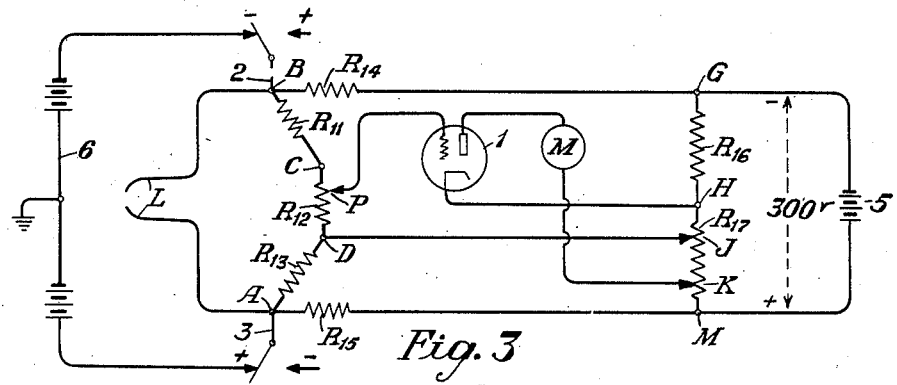
Figure 4:
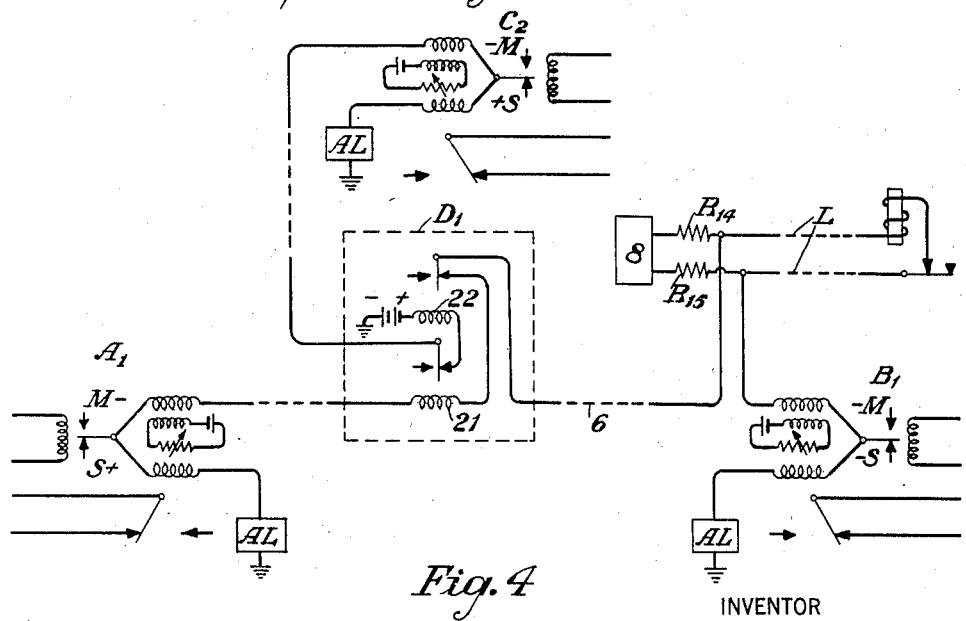

The invention may be more fully understood from the following description together with the accompanying drawing, in the Figures 1, 2, 3 and 4 of which the invention is illustrated. Figs. 1 and 2 show schematically the principles of operation of certain types of "hit" indicators. Fig. 3 is a circuit diagram of the "hit" indicator of this invention. Fig. 4 is a circuit diagram of a telegraph system illustrating certain conditions under which the "hit" indicator of this invention will function successfully while other types of "hit" indicators would not function successfully. Similar reference characters have been utilized to denote like parts in the several figures of the drawing.

In Figs. 1 and 2 are shown schematically, certain types of "hit" indicators. A subscriber's loop circuit is indicated at L. In Fig. 1 the loop L is closed and in Fig. 2 it is open to indicate a "hit" thereon. Bridged across the subscriber's loop at points A and B is a high resistance network comprising resistances $R_1$, $R_2$, $R_3$, $R_4$ and $R_5$ connected to a vacuum tube I as shown. Assume resistances $R_1$ and $R_2$ to be 100,000 ohms each, $R_3$ and $R_5$ 200,000 ohms each and $R_4$ to be 50,000 ohms. It can be seen that the voltage drop across points C and D or $R_2$ will be one-quarter the total voltage drop across points A and B. In the battery leads 2 and 3 connecting points A and B to plus and minus 130 volt battery, there would be current limiting resistances not shown. The value of these resistances would be so chosen as to provide a current flow of 60 milliamperes in the subscriber's loop, as is customary in the art. Accordingly, during a marking signal a current of 60 milliamperes flows in the telegraph loop terminal circuit and in the subscriber's loop L. There is, considering a 600 ohm subscriber's loop, therefore, a voltage drop of 36 volts across A and B. Across points C and D there will be a voltage drop of 9 volts or one quarter of the 36 volts. The vacuum tube I is so connected to an ungrounded plate battery supply that the cathode is more negative than the grid and hence plate current flows. The grid is made positive by the fact that point D is also connected to a voltage divider $R_4$ and $R_5$ and since the value of $R_4$ is 50,000 ohms and the value of $R_5$ is 200,000 ohms and the plate battery 130 volts, the voltage drop across $R_4$ is one-fifth of 130 volts or 26 volts. The grid current through $R_2$ can be disregarded, so that the voltage applied to the grid of tube I is the resultant of 26 volts positive and 9 volts negative which is 17 volts positive. This positive potential on the grid keeps the plate current flowing in the tube I as long as the subscriber's loop remains closed. Now should a "hit" occur and open the loop L the condition shown in Fig. 2 would occur. The potential now applied to points A and B would be 260 volts instead of 36 volts. The voltage drop across points C and D or $R_2$ would be one quarter of 260 volts or 65 volts. The potential now applied to the grid of tube I would be the resultant of 26 volts positive and 65 volts negative which is 39 volts negative. This will cause the tube to stop functioning and its plate current will fall to zero. This will cause a change in the reading of the meter M and indicate that a "hit" has occurred in the subscriber's loop circuit.

It will be seen that "hit" indicators operating on the foregoing principles are dependent on the voltage applied from conductors 2 and 3 or in other words the voltage applied from the telegraph loop terminal circuit. The telegraph loop terminal circuit might include a single line repeater connected to a "side-leg" toll circuit. Under certain conditions the single line repeater might open the telegraph loop terminal circuit. This would have the same effect as opening conductors 2 or 3 in Figs. 1 or 2. Such a condition will be more fully disclosed hereinafter with respect to Fig. 4. Under such conditions the "hit" indicator would be unable to operate if a "hit" occurred on the subscriber's loop L. The "hit" indicator of the invention is designed to function such condition.

In Fig. 3 is shown the "hit" indicator of this invention. The loop L is shown schematically and is connected by conductors 2 and 3 to the telegraph loop terminal circuit 6. Connected to the loop at the points A and B is the "hit" indicator of this invention. The "hit" indicator includes an ungrounded source of voltage 5 connected to points A and B through the high resistances $R_{14}$ and $R_{15}$. These resistances might have values of approximately 250,000 ohms. These resistances have a high value so that the voltage from battery 5 will not interfere with apparatus in the loop L or circuit 6. The negative terminal of battery 5 is connected to the point G, and the positive terminal of battery 5 is connected to the point M. Across the points G and M are the resistances $R_{16}$ and $R_{17}$ for purposes to be described hereinafter. Bridged across the points A and B are resistances $R_{11}$, $R_{12}$ and $R_{13}$. A vacuum tube 1 is provided which has its cathode connected to the point H. The plate circuit of the vacuum tube 1 includes a meter M and is completed over the conductor leading to point K. The grid circuit of the tube is connected to a point such as P on the resistance $R_{12}$ and thence is completed over the conductor leading to point J. The telegraph loop terminal circuit 6 is shown as opened at a point on conductor 2. As heretofore pointed out, with the telegraph loop terminal 6 opened "hit" indicators of the type shown in Figs. 1 and 2 would not operate if a "hit" should occur in the loop L. The arrangements of the invention will operate and indicate a "hit" on the loop L under such an open condition of the telegraph loop terminal circuit 6. The voltage of battery 5 will be approximately 300 volts. The voltage divider $R_{16}$ and $R_{17}$, as heretofore pointed out, is across the ungrounded voltage of 300 volts of the battery 5. Resistance $R_{16}$ merely limits the amount of plate voltage that can be applied to the vacuum tube. It will be seen that the potential at the point H which is applied to the cathode of the tube will be more negative than the potential applied to the grid and plate at points J and K, respectively. When the loop L is closed the potential applied at point J keeps the grid positive with respect to the cathode. This is because the potential drop across that part of resistance $R_{12}$ between points D and P is negligible because this part of resistance $R_{12}$ is short-circuited by the closed loop L. Variable tap K also helps to adjust the amount of plate current. When the loop L is opened, the voltage applied to the grid of the tube will be changed so that instead of being positive with respect to the cathode it will become negative and stop the operation of the tube. The voltage at the point J will be more positive than the voltage at point H. As heretofore pointed out with the subscriber's loop closed the voltage drop in the resistance $R_{12}$ between points D and P will be practically negligible because the closed subscriber's loop will short-circuit that part of the resistance. Now when the subscriber's loop opens the voltage drop across resistance $R_{12}$ between points D and P will cause the voltage at point P to be more negative than the voltage at point D. The resulting voltage then applied to the grid of the tube will cause it to change so that it is now negative with respect to the cathode instead of being positive with respect to the cathode. This will cause the tube to cease functioning and thus indicate a "hit" on the loop L.

With the conductor 2 closed instead of open as shown, the telegraph loop terminal circuit 6 will form a short-circuit for the battery 5 around the loop L. If a "hit" now occurs on the loop L, the "hit" indicator will operate due to the voltages applied from the batteries of the loop terminal circuit 6 in substantially the manner indicated with respect to Figs. 1 and 2. For example, we may assume that the loop when closed will have a resistance of 600 ohms. Under these conditions the voltage across the points A and B will be 36 volts, as explained with respect to Fig. 1. Assume a value for resistance $R_{11}$ of 100,000 ohms, a value for resistance $R_{12}$ of 100,000 ohms and a value for resistance $R_{13}$ of 100,000 ohms. Assume that the contact at point P is so positioned on resistance $R_{12}$ that the value of that part of the resistance between points P and D is 75,000 ohms. Then the voltage applied to the grid due to the drop in that portion of resistance $R_{12}$ between points P and D will be minus 9 volts. Resistance $R_{16}$ may have a value of 25,000 ohms. Resistance $R_{17}$ may have a value of 40,000 ohms. The contact at point J will be so positioned that the value of that portion of resistance $R_{17}$ between points H and J will be 5,650 ohms. The contact at point K will be so positioned that that portion of resistance $R_{17}$ between points J and K will have a value of 9,350 ohms. The portion of resistance $R_{17}$ between points K and M will be 25,000 ohms. With such resistance values the potential applied at point J will be plus 26 volts. Accordingly the potential applied to the grid will be the resultant of 26 volts positive and 9 volts negative which is 17 volts positive. This will cause the grid to be positive with respect to the cathode, and current will flow in the plate circuit of the tube. When the loop circuit is opened, there will be a voltage drop between the points A and B of 260 volts. With the resistance values given the potential drop across that part of resistance $R_{12}$ between points P and D will be minus 65 volts. Accordingly the potential applied to the grid will be the resultant of 65 volts negative and 26 volts positive which is 39 volts negative. This will cause the tube to cease functioning, and the meter will indicate the existence of a "hit" on the line. Of course, if the "hit" on loop L should occur when a polar spacing signal is being transmitted over the telegraph loop terminal 6, the voltage applied therefrom to the points A and B would not be 260 volts but would be 0 volts, and the "hit" indicator would not function while the polar spacing signal was being sent. Under such a condition the battery 5 would not cause the "hit" indicator to operate as heretofore pointed out because it would be short-circuited by the telegraph loop terminal circuit. However, if the "hit" continues after the expiration of the polar spacing signal and until the next marking signal is sent, then the "hit" indicator will function.

In Fig. 4 is shown a circuit diagram of a telegraph loop terminal shown schematically in Fig. 3 as 6. Repeaters $A_1$ and $B_1$ are shown connected together through a contact of the single line repeater $D_1$. The single line repeater $D_1$ connects a third repeater $C_2$ to repeaters $A_1$ and $B_1$. At $B_1$ is shown a subscriber's loop circuit L connected to the telegraph loop terminal. The "hit" indicator of the invention is shown schematically at 8 connected to the loop L by the high resistances $R_{14}$ and $R_{15}$. In transmitting signals from $A_1$ to $B_1$ or vice versa the contact of relay 22 of the single line repeater $D_2$ is always closed. However in transmitting a spacing signal from $C_1$ to $A_1$ or $B_1$ the contact of relay 22 will be opened. This will present a condition similar to that shown by the opening of conductor 2 of Fig. 3. Under such a condition the "hit" indicator of this invention will function when a hit occurs on loop L while other types of hit indicators would not function. As the single line repeater $D_1$ is well known in the art no detailed showing or description thereof has been given.

While the invention has been disclosed as embodied in certain specific forms which are deemed desirable, it is understood that it is capable of embodiment in many and other widely varied forms without departing from the spirit of the invention as defined by the appended claims.

What is claimed is:

1. A telegraph circuit, a subscriber's loop circuit connected thereto, a hit indicator connected to said loop circuit, said hit indicator comprising a resistance network, a vacuum tube and a non-grounded voltage source, said three last-mentioned elements being so arranged that when said telegraph circuit is open said tube will be operated when said loop circuit is closed due to the voltage applied to said tube from said source and said tube will be unoperated when said loop circuit is opened due to a change in the voltage applied to said tube from said source.

2. A telegraph circuit, a subscriber's loop circuit connected thereto, a hit indicator connected to said loop circuit, said hit indicator comprising a vacuum tube, a resistance network connected to the electrodes of said tube and means individual to said indicator and operative when said telegraph circuit and loop are opened for producing a voltage drop in a portion of said resistance network to control said tube.

3. A telegraph circuit, a subscriber's loop circuit connected thereto, a hit indicator connected to said loop circuit, a resistance network in said hit indicator, said hit indicator being controlled by a change in the voltage applied from said telegraph circuit to said resistance network in said loop circuit, said change in voltage being due to the occurrence of a hit in said loop circuit, and a battery in said hit indicator operative when said telegraph circuit is open for applying a voltage to said resistance network in said loop circuit whereby said hit indicator may be operated by a change in said last-mentioned voltage due to the occurrence of a hit in said loop circuit.

CLYDE CHRISTEN ANDERSON.